United States Patent [19]

Reed

[11] 4,183,264
[45] Jan. 15, 1980

[54] HYDROMECHANICAL TRANSMISSIONS HAVING ONE-WAY DEVICES TO BRIDGE EFFICIENCY DISCONTINUITIES

[75] Inventor: Bradley O. Reed, Pittsfield, Mass.

[73] Assignee: General Electric Company, Schenectady, N.Y.

[21] Appl. No.: 657,456

[22] Filed: Feb. 12, 1976

[51] Int. Cl.² .................... F16H 37/06; F16H 47/04
[52] U.S. Cl. ...................... 74/720.5; 74/687
[58] Field of Search .............. 74/687, 688, 720.5, 74/677, 682, 689, 718, 720

[56] References Cited

U.S. PATENT DOCUMENTS

| 3,250,151 | 5/1966 | Binger | 74/687 X |
|---|---|---|---|
| 3,292,455 | 12/1966 | Welch | 74/688 |
| 3,439,559 | 4/1969 | Binger et al. | 74/720.5 |
| 3,461,744 | 8/1969 | Booth | 74/720.5 |
| 3,496,803 | 2/1970 | Whelahan | 74/687 X |
| 3,529,492 | 9/1970 | Tuck | 74/720.5 |
| 3,538,790 | 11/1970 | Polak | 74/687 X |
| 3,575,066 | 4/1971 | Livezey et al. | 74/687 X |
| 3,583,256 | 6/1971 | Livezey | 74/687 X |
| 3,597,997 | 8/1971 | Phillips | 74/687 |
| 3,620,320 | 11/1971 | Armasow | 74/720.5 X |
| 3,698,498 | 10/1972 | Stanford | 74/720.5 X |
| 3,709,061 | 1/1973 | Orshansky, Jr. | 74/687 |
| 3,748,924 | 7/1973 | Cross et al. | 74/687 X |
| 3,786,696 | 1/1974 | Aleem | 74/687 |
| 3,815,698 | 6/1974 | Reed | 74/720.5 X |
| 3,861,240 | 1/1975 | Nolan et al. | 74/687 |
| 3,938,604 | 2/1976 | Kugler et al. | 74/720.5 X |
| 3,966,005 | 6/1976 | Binger | 74/720.5 X |

FOREIGN PATENT DOCUMENTS 1555338 10/1970 Fed. Rep. of Germany .......... 74/720.5

Primary Examiner—C. J. Husar
Assistant Examiner—Lance W. Chandler
Attorney, Agent, or Firm—Francis K. Richwine

[57] ABSTRACT

An improved multirange synchronous shifting hydromechanical transmission wherein an overrunning clutch in parallel with the friction clutch of the lower gear range of two adjacent ranges is used to permit bridging the discontinuity in efficiency curves of the two ranges at the shift point to sustain operation under a load condition falling between the two efficiency curves and to prevent "hunting" during shifts between the two ranges.

19 Claims, 5 Drawing Figures

HYDROMECHANICAL TRANSMISSIONS HAVING ONE-WAY DEVICES TO BRIDGE EFFICIENCY DISCONTINUITIES

BACKGROUND OF THE INVENTION

1. Field of the Invention

This invention pertains to multirange hydromechanical transmissions wherein shifts between ranges are accomplished by the relatively simultaneous activation of a brake or clutch controlling operation in one range and the deactivation of the brake or clutch controlling another range. These transmissions can be either one output (truck) or two output (steering) transmissions. Within this category, this invention more specifically pertains to those transmissions having hydraulic components to provide continuously variable drive ratios such as a pump/motor circuit and in which, as for example in an extended range transmission, there are different pressure-to-torque ratios in different ranges or in which for other reasons a discontinuity in output power or efficiency between ranges occurs at a shift point. One type of transmission within the field of invention is that in which a change of operating mode within the hydraulic system occurs at shift points, as for example in some synchronous shift transmissions, since such changes are often accompanied by a temporary or transitory condition in the hydraulic pump/motor circuit or a step to a higher operating pressure.

2. Description of the Prior Art

In addition to my U.S. Pat. Nos. 3,815,698 and 3,861,240; the patents to Mooney, U.S. Pat. Nos. 3,714,845; Orshansky, 3,709,061, 3,709,060 and 3,580,107; Polak, 3,596,535; and DeLalio, 3,306,129 are exemplary of systems in which successive ranges operate with different pressure-to-torque ratios, or in which an upshift in range is accompanied by a step to a higher hydraulic operating pressure, or in which there is a discontinuity of output power or efficiency at one or more shift points. FIGS. 7 and 8 of Orshansky, U.S. Pat. No. 3,709,060; FIGS. 6 and 13 of DeLalio, U.S. Pat. No. 3,306,129; FIGS. 19, 20, 30 and 31 of Orshansky, U.S. Pat. No. 3,580,107; FIG. 2 of Mooney, U.S. Pat. No. 3,714,845; and FIG. 2 of Polak, U.S. Pat. No. 3,596,535 are indicia of such criteria, either because of a change of slope of component speeds compared to vehicle speed or because of indicated changes in hydraulic operating pressures. In each of these systems, it is likely that when the transmission is working under a load that passes through the discontinuity in efficiencies, i.e., a load that would offer a resistance which would not impede acceleration of the vehicle in the lower of two ranges but is sufficient to preclude acceleration in the next higher range, or for that matter cause deceleration in the upper range, the load would cause the transmission to "hunt", i.e., to constantly shift back and forth between the two gear ranges. Although not particularly pointed out in any of the patents cited, it has been customary in the art to attempt to overcome this "hunting" problem by means of the use of time delays, hysteresis valves, and other control techniques. The configuration of many of these transmissions are also such that operation in the higher of the ranges at or near the shift point may cause one or more elements to assume a motion which is exactly that which the brake or clutch of the lower range is designed to prevent. Such motion can be self-defeating for the system, particularly in those instances in which a reaction point is made unavailable, as for example a ring gear in a planetary set which backs up instead of varying from zero to a high forward speed.

None of the art with which I am familiar solves this problem in the manner which constitutes the subject matter of this application. Although Phillips in U.S. Pat. No. 3,597,997 uses a one-way brake 41 and one-way clutch 60, neither the situation nor the result of such usage corresponds to either the problem or to my solution. Phillips was apparently concerned with the improvement of the quality of shifts and devised his system to avoid very stringent requirements of brake and clutch timing. More details pertaining to the prior art will be apparent from my description of a preferred implementation as applied to one sample transmission within the class defined.

SUMMARY OF THE INVENTION

My invention, therefore, is to use a one-way device, as for example an overrunning clutch to preclude undesired action of a transmission element occurring under critical load conditions in the higher range of two at a speed near a shift point which is of the character described above. Although this overrunning clutch is in parallel with the brake of the lower gear range in the system that I describe below as exemplary of the class of transmission, it is also possible that in another system the motion to be precluded would be a rate of motion less or more than the rate of motion of another element.

My invention as applied to a specific system such as the one described below can be used to preclude the undesired backward motion of an element which although normally held or driven at least partially as a result of hydraulic pressure, can be subjected to excessive loads or other changes, as for example as a result of a change of operating mode of hydraulic components at a shift point.

DESCRIPTION OF A PREFERRED EMBODIMENT

Figure 1:
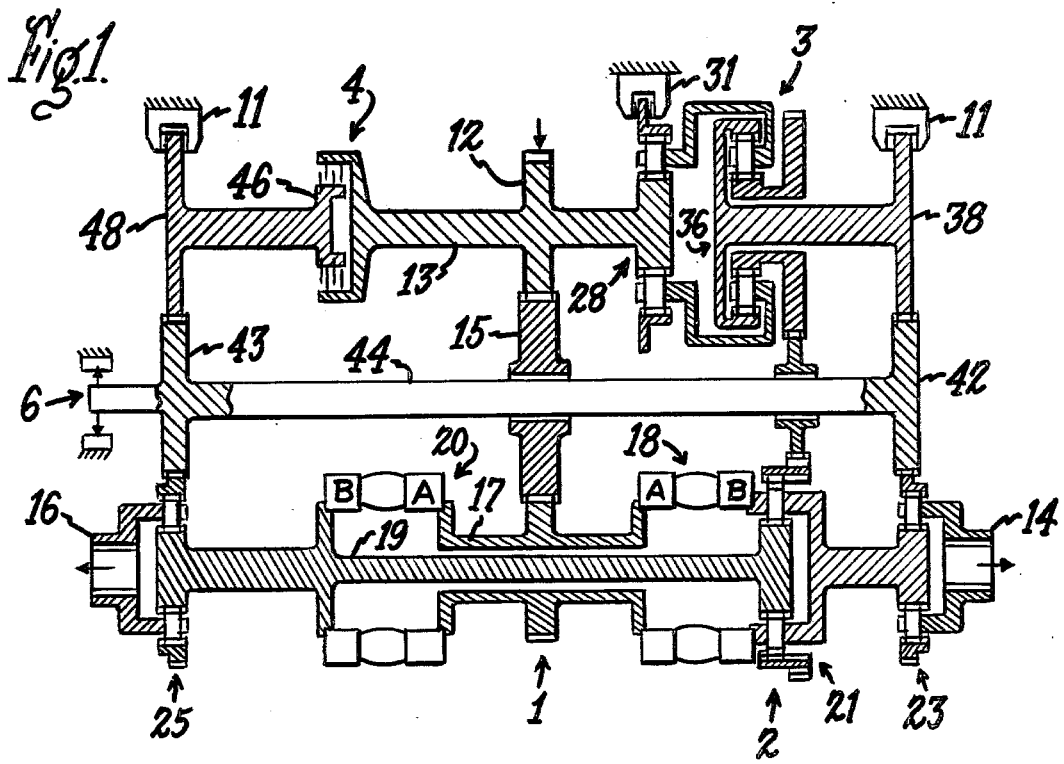
FIG. 1 is a diagrammatic view of a transmission according to my U.S. Pat. No. 3,815,698, modified to incorporate the invention.

For the purpose of explaining my invention, I have chosen to describe its application to my hydromechanical steering transmission, as more fully explained in U.S. Pat. No. 3,815,698, as one example of its application to a type of transmission. This transmission, modified in accordance with this invention, is illustrated in FIG. 1. The transmission has two hydrostatic ranges (first and reverse) and two hydromechanical ranges (second and third forward). This transmission includes an input for mechanical power in the form of gear train 12, 15 and 17 and has right and left output drives 14 and 16. First and reverse ranges are hydrostatic and are powered by two hydraulic components 18 and 20 wherein the "A" units are hydraulic pumps and the "B" units are hydraulic motors. Although the hydraulic components in this particular transmission are ball piston pump and motor combinations, they could be of any kind in which at least one of the units in each component has an infinitely variable capacity. The hydraulic motors drive the suns of planetary units 23 and 25, operating against stationary ring gears, and drive outputs 14 and 16 which are attached to the planetaries of units 23 and 25. In both first and reverse ranges, brakes 11 are actuated to immobilize gears 38, 48, 42 and 43, thereby maintaining the ring gears of the output planetary units 23 and 25 stationary to provide reaction points for the planetaries. First and reverse are differentiated by the difference of directional movement controlled within the hydraulic components. Steering is accomplished by creating a differential speed between the two hydraulic components 18 and 20 causing a proportional differential in speed between outputs 14 and 16. Third range differs from first range in operation solely by the fact that with the first range brakes 11 released and the third range clutch 46 activated, there is an additional mechanical input through the third range drive 4 which, driving through gears 48 and 43, causes shaft 44 and gears 42 and 43 to drive the ring gears of planetaries 23 and 25 in a direction to add a forward speed to outputs 14 and 16. Since power is most commonly furnished in these systems by a diesel engine, the control system would, under normal operation, provide for an almost constant speed through the mechanical third range gear train 4 so that speed variation in third range as well as output speed differential for steering would be accomplished through the hydraulic units 18 and 20. Second range is based on the concept of driving the ring gears of sets 23 and 25 at speeds between zero in first range and the constant speed of operation in third range. This is accomplished by second range gearing 3 which is activated by brake 31 which secures the ring gear in planetary set 28 so as to drive the carrier of 28 responsive to the mechanical input on the sun of 28. The carrier of 28 is connected to the carrier of planetary set 36. The sun of 36 is geared to the ring gear of planetary set 21 which, as a part of the steering differential 2, is placed in the system for the purpose of obtaining an output from the hydrostatic transmission portion 1 that is an average of the "B" speeds of hydraulic components 18 and 20. This steering differential 2 permits an additional point of output power from the hydrostatic stage 1 which not only does not interfere with the steering function but permits a direct steer in the second range. The ring gear of planetary set 36, therefore, is driven hydromechanically as a result of the two inputs and is driven at a speed that will change according to the average speeds of hydraulic motors "B". The output of this second range gearing 3 is provided through gear 38 and the crossshaft 44 to the rings of planetary sets 23 and 25.

My invention as applied to this particular model transmission, which as noted above is exemplary of a class of transmissions, contemplates the addition of overrunning clutch 6 which limits motion of cross-shaft 44 and consequently gears 42 and 43 and the ring gears of planetary sets 23 and 25 to two conditions, i.e., stationary or a one-way direction which, of course, is the direction of motion of those elements in the second forward range. As will become evident subsequently, the location of the overrunning clutch, or for that matter its attachment to the cross-shaft 44 as opposed to other elements, is not crucial.

Figure 2:
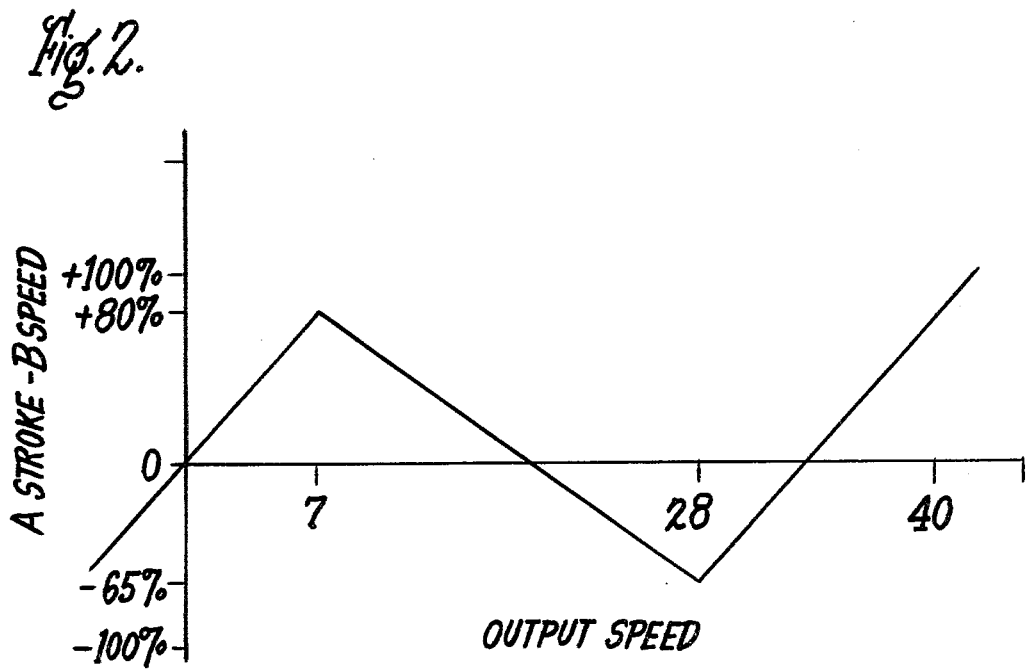
FIG. 2 is a graphic display of the setting of the capacity of the hydraulic pumps and the theoretical hydraulic motor speed used in the hydraulic units of the same transmission related to transmission output speed.
Figure 3:
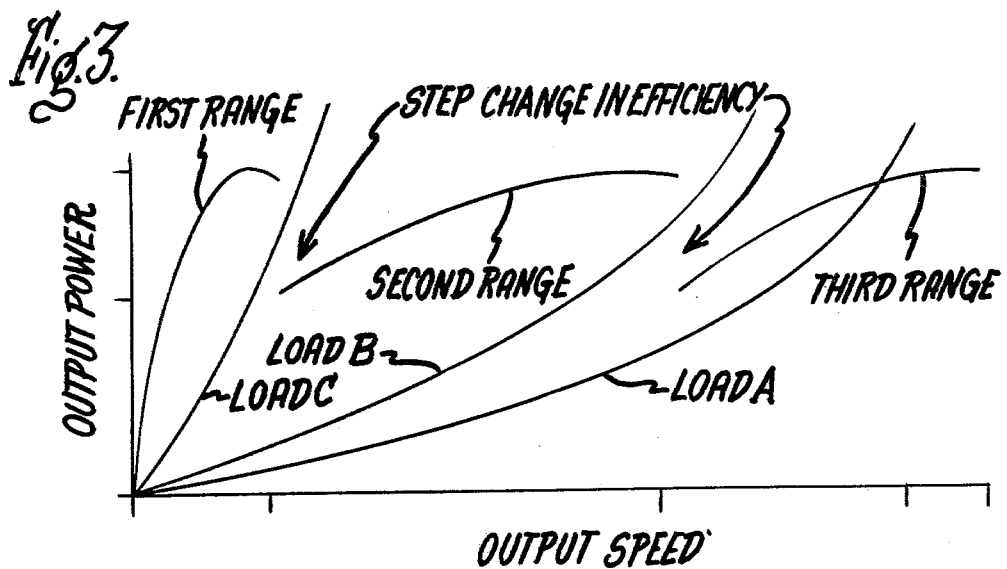
FIG. 3 is a graphical illustration of the relationships among the output power/efficiencies of a composite transmission of this type in the various ranges with some representative loads.
Figure 4:
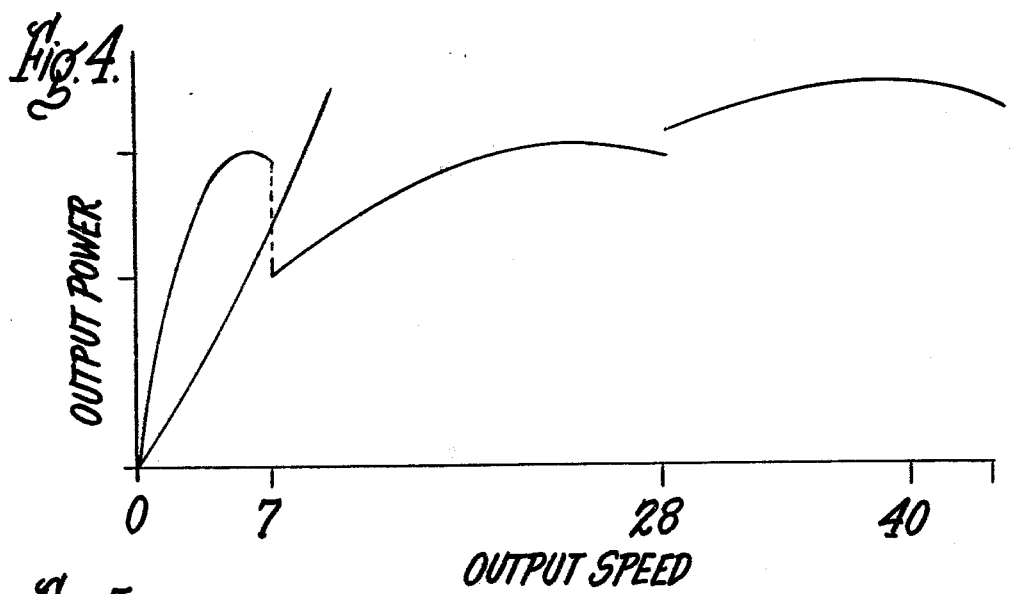
FIG. 4 is a graphic representation of the solution to the problem based on the range curves and one load as applied to the transmission of FIG. 1 including some information similar to that displayed in FIG. 3.

To more fully explain the problem to be corrected by the use of the overrunning clutch 6, it is necessary to consider certain operational behaviours of this transmission at various times. FIG. 2 shows a graph wherein the stroke of each hydraulic pump "A" which is indicative of pump capacity and the resulting speed of each hydraulic motor "B" which are theoretically the same for straight ahead drive, are plotted against the vehicle speed. This shows that under small load conditions, the speed of the hydraulic motor will be equal to the same percent of the speed of the hydraulic pump as the capacity of the pump, as the capacity of the pump is varied. It also illustrates the fact that both the percentages of pump capacity and the resulting motor speed are being reduced from a positive 80 through 0 to a negative 65, all through second range operation; that there are reversals or changes of mode taking place in the hydraulic system at the shift points between first and second and between second and third (which are synchronous shifts); and that there is an inherent difference between second range and the other ranges related to the different slope of the second range line. FIG. 3 is a graphic illustration of the fact that, in a transmission of the class considered, there may be a discontinuity in output power or efficiency at each of the range changes depending on whether or not the next range has a higher or lower pressure-to-torque ratio which among other things causes more or fewer losses under load. Such is the case with the Nolan-Reed transmission disclosed in U.S. Pat. No. 3,861,240. FIG. 3 also contains lines representing three different ones of the infinite numbers of loads that could be placed on the hypothetical composite transmission. A load such as load "A" would be a typical operational load on a vehicle which would, in effect, dictate that the load would prevent the vehicle from ever reaching its theoretical top speed since the intercept between the load "A" curve and the third range curve is slightly below the designed top speed. Load curves "B" and "C", however, illustrate two loads which can cause problems in this type of synchronous shift transmission. Each of these load curves "B" and "C" run through the discontinuity of efficiency curves which occur at shift points. FIG. 4 is a graphical representation of the output efficiency/power of my steering transmission wherein only the first-second range shift involves a discontinuity of efficiency of the type causing problems.

Consider now my particular transmission, first to second range shift point and load "C" as depicted in FIG. 4, although in various transmission designs, this condition could exist at any one, or all, of the shift points as already pointed out with respect to FIG. 3. If a vehicle with my transmission were operating against load "C", as shown in FIG. 4, there would be no problem with first range operation and, as the vehicle approached the shift point, the control system would automatically cause the transmission to be shifted into second range by release of the first range brakes and application of the second range brake. Conversely, if the vehicle were operating in second or third range and ran into conditions which could impose load "C" (as for example a steep hill, or mud, etc.), the vehicle would be slowed until the output speed would theoretically be reduced to that of the intersection of the second range curve and the load "C" line. As the speed dropped to the shift point, the controls would cause a shift by release of the second range brake and application of the first range brakes. In either event, the transmission could assume a "hunting" condition wherein operation in second would cause the vehicle to slow, the control system to call for first range followed by acceleration in first range to the point where the control system would again call for second range. In my particular transmission (merely as an example of the condition which I address in this disclosure), the condition can be accompanied by a situation in which, with the second range brake engaged and the first range brakes disengaged, the load resistance (C) not being overcome will permit the ring gears of planetary sets 23 and 25 to back up because of insufficient torque applied through the second range gearing 3. This is a less efficient combination than operation in first range against the same load and results from the facts that shift control is at least partially controlled by pump setting and that, under such load, the "B" units, and consequently the vehicle, have a tendency to slow below the normal shift point speed. Under these conditions, the hydraulic component is working at a higher pressure, part of the gear train (output rings, cross-shaft, etc.) is running in a less efficient mode than in a lower gear range and the transmission as a whole is operating at a lower efficiency than it would be if operating at the same vehicle speed in first range. In this particular transmission, therefore, the possibilities of solution would be to decrease the efficiency of the first range so as to avoid a discontinuity between efficiencies in first and second range; to decrease the efficiency of first range only in the neighborhood of this shift point; or to increase the efficiency of second range particularly at the shift point. Still another possible solution in the case of my steering transmission would be to change the control system so as to have a different sequence of brake releases and applications. None of these solutions is considered adequate since all would unfavorably effect vehicle top speed and in some instances would detract from first range efficiency which is required for transmissions of this type since whether they be for a truck or track-laying vehicle they are generally for heavy vehicles. The object, therefore, is to close the discontinuity between ranges at the shift points by some means. The means that I put forth in this invention is by means of the overrunning clutch which will prevent the back-up condition occurring in the rings of the output planetaries. It is true that reverse action of the output rings and cross-shaft in this particular application could be prevented in the condition of deceleration against a load in second range by earlier application of the first range brakes. However, it would be most difficult to devise a control system which could do that and then thereafter release the first range brakes when sufficient acceleration took place so as to begin operating again in a valid second range condition. Use of the overrunning clutch permits second range acceleration and its associated increasing speed condition of the output ring gears as soon as the available torque is sufficient to overcome the load; thus precluding extensive engineering and additional components which in themselves would be the source of reliability and other problems. Use of overrunning clutches in lieu of the first range brakes as sometimes used by the prior art is not satisfactory in this type of transmission without a separate reverse brake as reverse gear requires that the output planetary rings be secured against movement in the direction associated with forward motion of the vehicle. In addition, overrunning clutch construction is generally insufficient, too difficult, or too costly to permit adequate reliability under the high torque conditions associated with the initial starting of a vehicle under load conditions. Even the use of clutches in series as used by Phillips presents extreme engineering problems. My solution of the addition of an overrunning clutch in parallel with the brake or clutch of one gear involved in the shift, in this case the lower range, is, therefore, a more feasible solution in that the overrunning clutch need never assume the maximum loads associated with the general operation in the range involved. Accordingly, placement of a temporarily acting means for filling in a discontinuity as illustrated by the dashed line in FIG. 4 is the general solution to this problem and may also be characterized as providing a one-way device which will prevent an element or elements from assuming an operational mode which is less efficient than its operational mode in the next lower gear range. In my transmission which I have used as an example, implementation is by means of the addition of the overrunning clutch 6 in the system so as to prevent an undesired reverse motion of the output planetary rings—a mode of operation less efficient than the mode in first range—to close the discontinuity between the first and second ranges. Although implementation of my invention in my steering transmission is best provided by an overrunning clutch to prevent the reverse rotation of an element, it is possible that implementation of my invention in other transmissions would be by means of a device or combination of devices to prohibit a speed of a component which is more or less than a predetermined speed. Such implementation could be accomplished by use of an overrunning clutch in combination with a gear train or reversing gear train having a gear ratio to permit an overrunning clutch similar to mine to cause a critical component to be denied a speed more or less than a predetermined RPM. Overrunning clutch 6 as used to implement the invention in my steering transmission may be of any standard, commercial or special design which will fit the requirements of size and load. This invention, in fact, was reduced to practice by means of the external attachment of a commercially available overrunning clutch to a prototype transmission which was then run in a dynamometer test cell. Test data confirmed that sustained operation was possible at loads which fell between the efficiency curves of two successive ranges.

Although the foregoing shows a specific application of my concept to the first to second range shift point in my transmission forming the subject matter of U.S. Pat. No. 3,815,698, my invention extends to the improvement of all transmissions, particularly synchronous shift transmissions having these characteristics by the use of one or more overrunning clutches or other one-way devices to close shift point discontinuities and efficiencies. One application of my concept to the truck transmission forming the subject matter of U.S. Pat. No. 3,861,240, to John M. Nolan and myself would be by means of securing shaft 36 against reverse motion during operation in third range against a load condition falling between second and third ranges. Application of my concept to the first-second range shift would be more complicated and would probably involve limiting the maximum speed of shaft 36 to a value that could be derived from the power input train 1. Specific application to other transmissions, as for example those of Orshansky, Mooney, or DeLalio, would require more detailed analysis and in some cases might require observation of an actual transmission running under various load conditions. It is also pointed out that this usage is different from the more common use of overrunning clutches in automobile transmissions to permit lower range clutches to remain engaged while higher range clutches are engaged, as for example as disclosed by Phillips.

Figure 5:
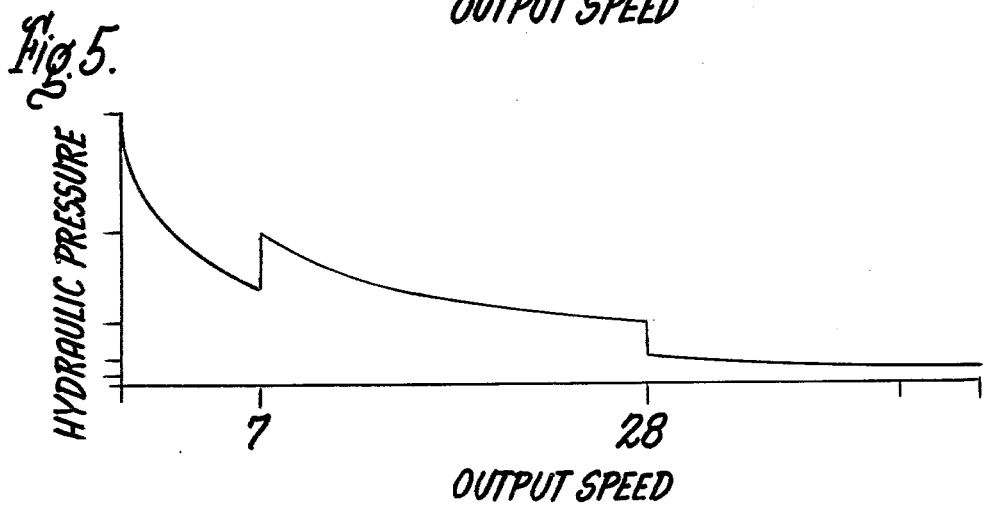
FIG. 5 is a graphic representation of the operating hydraulic pressures within the hydraulic components of the transmission of FIG. 1 as related to the vehicle speed.

The presence of the condition that my invention is intended to correct can be predicted, if not determined, from certain characteristics of a transmission since one type of discontinuity always has the potential of producing the problem. Consider FIG. 5 which is indicative of the hydraulic pressure existing in the hydraulic units of my steering transmission during operation in the different ranges. This graph shows that the operating pressure in the second range is generally higher than the pressures in the first and third ranges except for the pressure at the peak torque portions of first range operation. This graph which is indicative of the pressure-to-torque ratios in the ranges may be related to a design which permits an extended speed range coverage in particular ranges. Therefore, criteria identifying transmissions which can be improved by use of my concept include a higher operating pressure in one range of a hydromechanical transmission than there is in the next lower range and in some instances a higher pressure-to-torque ratio often accompanying a range having an extended speed coverage as disclosed by a graph such as FIG. 2. For example, FIG. 2 of U.S. Pat. No. 3,861,240 (Nolan and Reed) indicates that the discontinuity of efficiency situation exists at both the forward speed shift points as commented on above.

Having shown and described an embodiment of the invention, I point out that it is to be understood that the invention is not limited to the details of its application to my steering transmission and that modifications, applications, or variations, other than those applications which I have suggested with respect to other transmissions, of my invention will occur to those skilled in the art without departing from the spirit and scope of the invention as defined in the following claims.

I claim:

1. In a multirange hydromechanical transmission wherein shifting is accomplished by the release of gear element engaging means controlling one propulsion gear range and by the application of gear element engaging means controlling another gear range and wherein there is a discontinuity of output power and efficiency at the shift point between propulsion ranges with an excess of power in the lower range and less power in the higher range which is insufficient with respect to critical loads, the improvement comprising incorporation of a one-way element to provide self releasing gear reaction to bridge said discontinuity when running in the higher range under those critical loads.

2. The improved transmission of claim 1 wherein said transmission includes an operating component which operates in a mode less efficient when the transmission is in the higher range under such critical load than the mode in which it operates when the transmission is in the lower range and wherein said one-way element biases said operating component against operating in said less efficient mode under said critical load.

3. The improved transmission of claim 2 wherein said transmission is a synchronous shift transmission.

4. The improved transmission of claim 3 wherein said one-way device is an overrunning clutch which biases said operating component against operation in said less efficient mode by preventing a gear element of said transmission which is active in said higher range from rotating in a direction other than its normal direction.

5. The improved transmission of claim 4 wherein said transmission includes a planetary gear set of which two elements in said higher range are driven by two inputs, the third element of which is the output and the overrunning clutch prevents one of said elements from backing up under said critical load.

6. The improved transmission of claim 3 wherein said one-way device biases said operating component against operation in said less efficient mode by preventing a gear element of said transmission which is active in said higher range from exceeding a rate of rotation proportional to that of another element of the transmission.

7. The improved transmission of claim 3 wherein said one-way device biases said operating component against operation in said less efficient mode by preventing a gear element of said transmission which is active in said higher range from operating with a rate of rotation which is less than one proportional to that of another element of the transmission.

8. In a multirange hydromechanical transmission including a hydrostatic component, at least one mechanical gear train component, a mixing and output drive train component, clutch means for alternately fixing and releasing elements of said components with respect to other moving or stationary elements to cause said components to be used in distinct combinations to constitute gear ranges, and means for operating said clutch means for fixing and releasing to cause said transmission to shift from one range to another, wherein two successive gear ranges employ said hydrostatic component under different hydraulic operating pressures and wherein, during operation at or near a shift point between said ranges in which said hydraulic operating pressure for the higher range is higher, a critical load can cause said hydrostatic component to operate in a less efficient mode in the higher range than the mode in which it operates in the lower range; the improvement comprising incorporation of a one-way device to limit operation of said hydrostatic component to operate in the more efficient mode.

9. The improved transmission of claim 8 wherein said components include one element which in said lower range is stationary and in said higher range normally runs in one direction and wherein said one-way device is an overrunning clutch which prevents said one element from running in the opposite direction.

10. The improved transmission of claim 8 wherein said components include one element which in said lower range is stationary relative to some other element and in said higher range normally runs in one direction relative thereto and wherein said one-way device is an overrunning clutch which prevents said one element from running in the opposite relative direction.

11. The improved transmission of claim 9 in which said transmission is a synchronous shift transmission, said mixing and output drive train component includes gear means for combining two inputs to produce an output in the higher range and said one element is included in the portion of said gear means which introduces one of the two inputs to be combined in operation in said higher range.

12. In a synchronous shifting multirange hydromechanical transmission including
an input power train,
an infinitely variable hydrostatic drive component driven by said input power train,
at least one mechanical drive component driven by said input power train,
an output power train including at least one power output connected to said drive components for receipt of power from each or combinations of said drive components, and
clutch means for selectively fixing to and releasing elements of said components from other elements of said transmission whereby selective actuations of said clutch means to permit different combinations of said components to drive said output power train to cause said transmission to operate in a plurality of distinct ranges of different drive ratios,
and wherein there is a discontinuity of output efficiency between two successive said ranges each utilizing the hydrostatic drive component with the higher speed range having the lesser efficiency,
the improvement comprising a one-way device operatively connected to an element which is operative during transmission operation in said higher range to prevent said hydrostatic component from assuming a mode of operation in said higher range which is less efficient than its role in the lower range to bridge said discontinuity.

13. The transmission of claim 12 wherein there are two said mechanical drive components and said two successive ranges are both hydromechanical.

14. The transmission of claim 13 wherein said one-way device is an overrunning clutch which prevents a rotatable drive element from turning in a direction opposite from that in which it turns in said higher range.

15. The transmission of claim 13 wherein said one-way device is an overrunning clutch which prevents a rotatable drive element from turning at a velocity more than a velocity that is a function of the velocity of another drive element.

16. The transmission of claim 12 wherein said lower range is a hydrostatic range and said higher range is a hydromechanical range and said one-way device is an overrunning clutch which prevents a rotatable drive element from turning in a direction opposite from that in which it turns in said higher range.

17. The transmission of claim 12 wherein said output power train includes two power outputs and said components include differential means for varying the speeds of said two power outputs one from the other to cause said transmission to be a steering transmission.

18. The transmission of claim 17 wherein said lower range is a hydrostatic range, said higher range is hydromechanical, said differential means is included in said hydrostatic drive component and said one-way device is an overrunning clutch which prevents a rotatable drive element which is attached to both said power outputs from turning in a direction opposite from that in which it turns in said higher range.

19. The transmission of claim 18 wherein there are two said mechanical drive components each connected to both said two power outputs and wherein said transmission also includes a differential device interconnecting said hydrostatic component and the one said mechanical drive component which is used in said higher range to provide to said higher range an output of the hydrostatic component which is the average of the two speeds produced by the differential means to provide a hydrostatic input to said higher range to cause said higher range to be hydromechanical.

* * * * *